July 12, 1949.    B. E. LUBOSHEZ    2,475,973
SAFE-HANDLING FILM PROCESSING UNIT
Filed Sept. 28, 1945    4 Sheets-Sheet 1
FIG. 1.
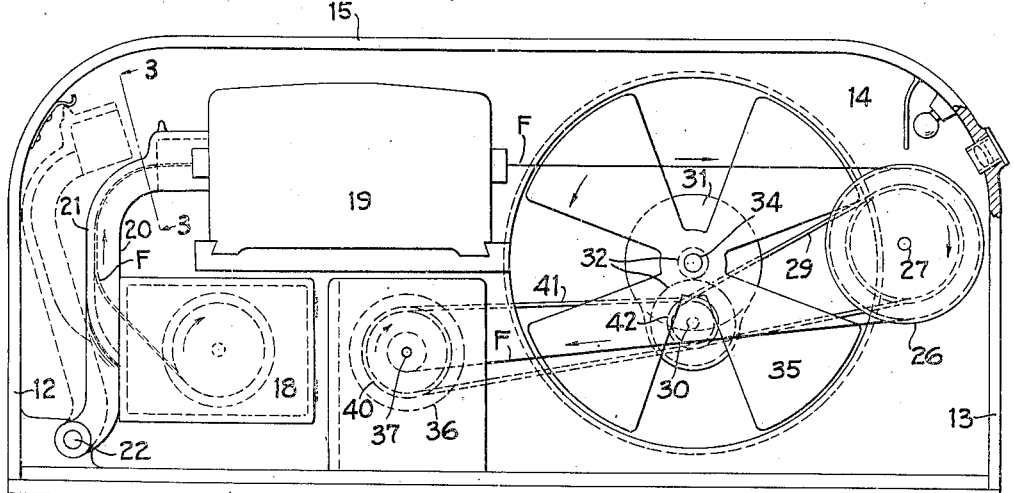
FIG. 2.
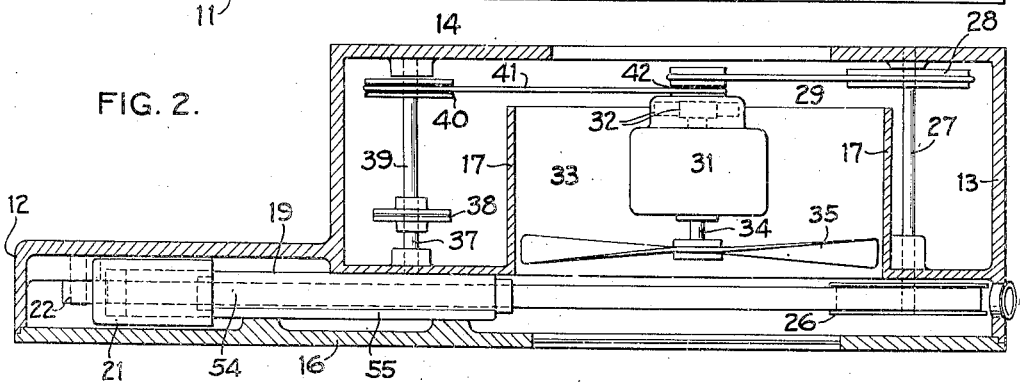
FIG. 10.
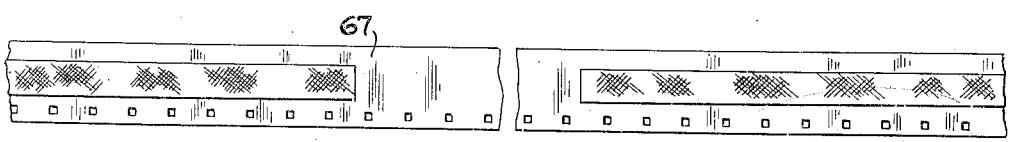
FIG. 3.
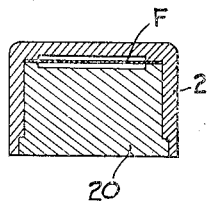
FIG. 15.
BENJAMIN E. LUBOSHEZ
*INVENTOR*
BY
*ATTORNEYS*

July 12, 1949.  B. E. LUBOSHEZ  2,475,973
SAFE-HANDLING FILM PROCESSING UNIT
Filed Sept. 28, 1945  4 Sheets-Sheet 2

BENJAMIN E. LUBOSHEZ
INVENTOR
BY *[signatures]*
ATTORNEYS

July 12, 1949.  B. E. LUBOSHEZ  2,475,973
SAFE-HANDLING FILM PROCESSING UNIT
Filed Sept. 28, 1945  4 Sheets-Sheet 3

BENJAMIN E. LUBOSHEZ
INVENTOR
BY *(signatures)*
ATTORNEYS

July 12, 1949.  B. E. LUBOSHEZ  2,475,973
SAFE-HANDLING FILM PROCESSING UNIT
Filed Sept. 28, 1945  4 Sheets-Sheet 4
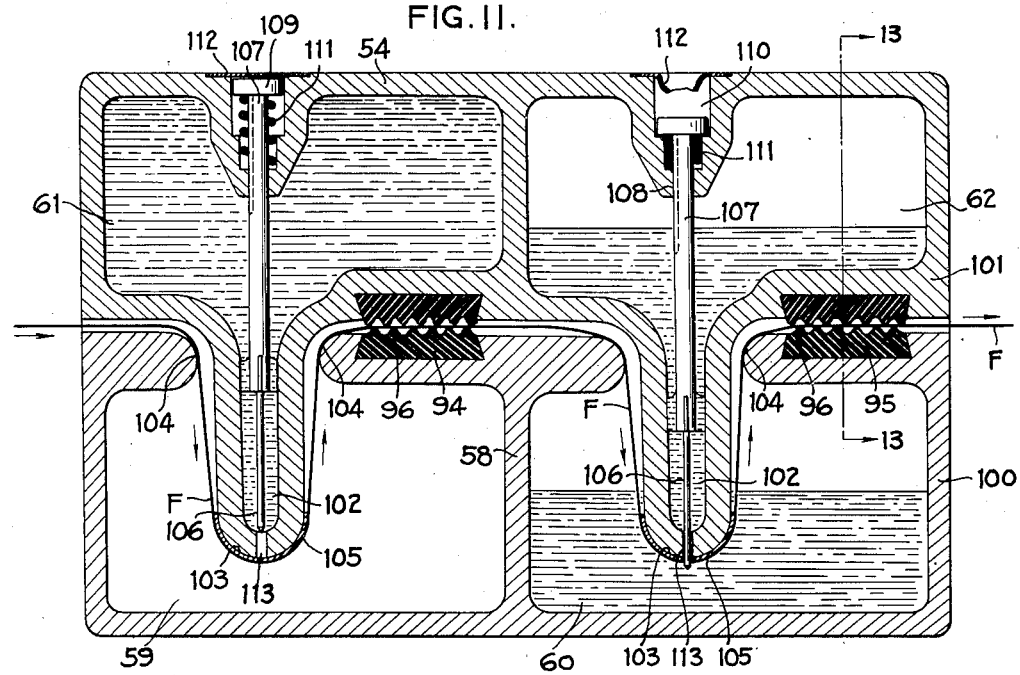
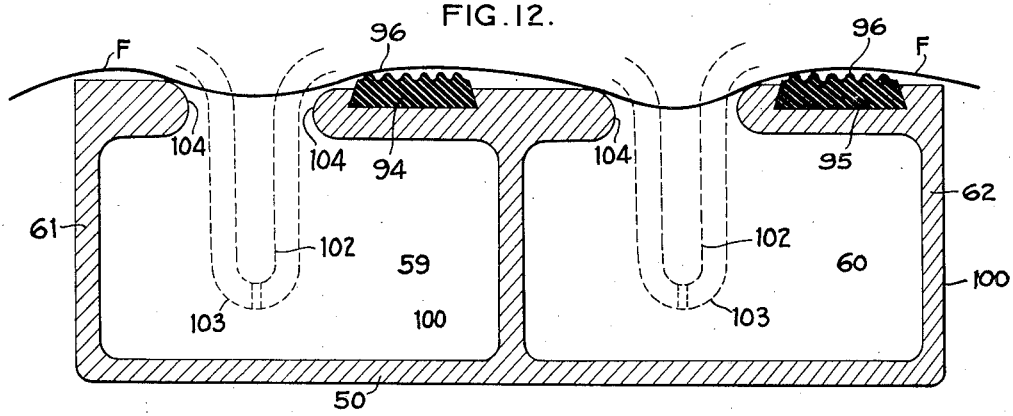
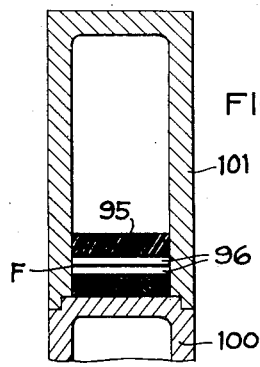
BENJAMIN E. LUBOSHEZ
*INVENTOR*
BY
*ATTORNEYS*

Patented July 12, 1949

2,475,973

UNITED STATES PATENT OFFICE 2,475,973

SAFE-HANDLING FILM PROCESSING UNIT

Benjamin E. Luboshez, Rochester, N. Y., assignor to Eastman Kodak Company, Rochester, N. Y., a corporation of New Jersey Application September 28, 1945, Serial No. 619,134

18 Claims. (Cl. 95—94)

The present invention relates to an automatic machine or device for processing, or developing and fixing a strip of material such, for example, as motion picture film, and more particularly to a removable, compact, and unitary processing or developing and fixing unit for use in connection therewith. By the term "fixing" is meant any process which renders the developed image permanent.

While the apparatus of the present invention will be described and illustrated in connection with the developing and/or processing of a strip of photographic film, such as motion picture film, this is by way of illustration only as it is contemplated that the apparatus of the present invention is adapted for a wide range of uses. For example, the present apparatus may be utilized in coating or impregnating a strip or web of material where it is desirable to keep the treating liquids away from the operator, or for any reason where it is desired to coat or impregnate it without the operator touching or coming into contact with the coating liquids or solutions.

In the usual method of developing or processing of motion picture films, the various treating liquids are arranged in open tanks or trays, and the film strip is passed through these tanks or trays and in contact with the liquids or solutions positioned therein. With such an arrangement, the development is usually done in a darkroom. In addition, the operator must prepare the necessary developing, or other processing, solutions and may be exposed thereto, particularly if the film threading is done by hand. Also, such developing units are usually cumbersome and costly. Furthermore, the solutions must be periodically renewed or replenished, thus necessitating a supply of water for dissolving the chemicals to form the solutions as well as the receptacle for receiving exhausted solutions.

In order to overcome these difficulties, the present invention provides a small, compact, and simple developing and fixing unit which permits daylight developing and fixing. The operator merely inserts the unexposed film into one side of the unit and withdraws the developed, fixed, and wiped film from the other side thereof. There are no chemicals to mix, and the operator does not come in contact with such chemicals. Furthermore, the operator is not required to thread the film, pour off old solutions and replace with new, or clean any part of the apparatus after processing. This unit is connected to a supply of exposed film, and also to a drying and wind-up mechanism.

According to the invention, the film processing unit embodies a body portion or box formed with film tracks or guides for leading the film along a specified path, one or more compartments in which processing takes place successively, sealed chamber for holding the processing solutions or liquids until they are required for use, and wiping and cleaning devices for removing surplus solutions, the whole being easily removed and exchanged for new units as each roll of film is processed.

In its most simple form, the processing unit consists of a box made of molded plastic, or other suitable material, which is removably positioned on the processing machine. The box may be made either in one or two separate pieces and is provided with suitable tracks or guides for the film strip. In the preferred arrangement the lower part of the box is hollowed out to form one or more recesses or compartments adapted to receive the processing or developing and fixing solutions when the processing begins, as will be later described. The upper part of the box, on the other hand, is provided with suitable cavities or chambers in which the developing and fixing solutions or liquids are sealed until they are ready to be used. Thus, the box or processing unit contains sealed-in solutions, and dry processing compartments, and may, therefore, be safely shipped and/or handled without danger of spilling or mixing the solutions. The unit may thus be handled much in the manner of an electric dry cell, and, when it is to be used, it is inserted in place in the processing machine.

In use, the developing box or unit is mounted on a machine between a container of exposed film and a wind-up and drying mechanism. A suitable light-tight connection is provided between the film container and the processing unit. As the film is fed through the apparatus, or just prior thereto, the sealed chambers enclosing the solutions or liquids are unsealed, in a manner to be later described, to allow the treating solutions or liquids to flow into the proper processing or treating compartment. The film strip is then moved successively through the various compartments and in contact with the solutions therein. As the film leaves each compartment, it passes through a squeegee or wiper which effectively removes surplus solutions. After the film leaves the processing unit, it passes through a drying chamber, and is finally wound up on a wind-up reel. The entire machine is small, compact, and portable, and may be operated even by unskilled operators and in daylight. After each roll of film has passed through the processing unit and is dried and wound up, the processing unit is removed and either discarded or put aside to be collected for cleaning and refilling by the manufacturer. In either case, a new unit is substituted for the old one, and all is ready for processing another roll of film. Thus, the operator has only to deal with a clean, sealed unit each time, and all contaminated parts of the processing unit are quickly removed on each occasion. The processing unit may be made either as a single piece or as a pair of separable members, all as will be hereinafter more fully described.

The present invention has, therefore, as its principal object the provision of an automatic strip processing machine provided with a unitary processing unit which is removable and replaceable.

Still another object of the invention is the provision of a replaceable processing unit in which the various processing solutions are sealed until ready for use.

Yet another object of the invention is the provision of a processing unit which does not require the threading of the film therethrough.

A further object of the invention is the provision of a replaceable processing unit which does not require cleaning by the user.

And still another object of the invention is the provision of a processing unit of the class described which is simple in construction, easy and inexpensive to make, easy to use, clean, rugged, and highly effective in use.

To these and other ends, the invention resides in certain improvements and combinations of parts, all as will be hereinafter more fully described, the novel features being pointed out in the claims at the end of the specification.

In the drawings:

Fig. 1 is a side view of the complete machine, with the side plate removed, showing the relation of the replaceable processing unit of the present invention;

Fig. 2 is a top view of the machine illustrated in Fig. 1, with the outer casing shown in section;

Fig. 3 is a sectional view taken substantially on lines 3—3 of Fig. 1, showing the structure of the light lock between the film magazine and the processing unit;

Fig. 10 is a view of the leader strip showing the chamber sealing means illustrated in Figs. 4 and 5 secured thereto;

Fig. 11 is a vertical sectional view through a modified form of processing unit to form upper and lower separable members;

Fig. 12 is a view similar to Fig. 11, but with the upper member removed, showing the arrangement for positioning or threading the film over the lower member;

Fig. 13 is a vertical sectional view taken substantially on lines 13—13 of Fig. 11, showing the arrangement for connecting the upper and lower members of the unit illustrated in Fig. 11;

Fig. 14 is a vertical sectional view through the lower end of the liquid chambers shown in Fig. 11, showing the relation of the rupturing members for the liquid chambers; and Fig. 15 is a view similar to Fig. 9 but on a somewhat smaller scale, showing another method of sealing a liquid chamber until ready for use.

Similar reference numerals throughout the various views indicate the same parts.

Figure 4:
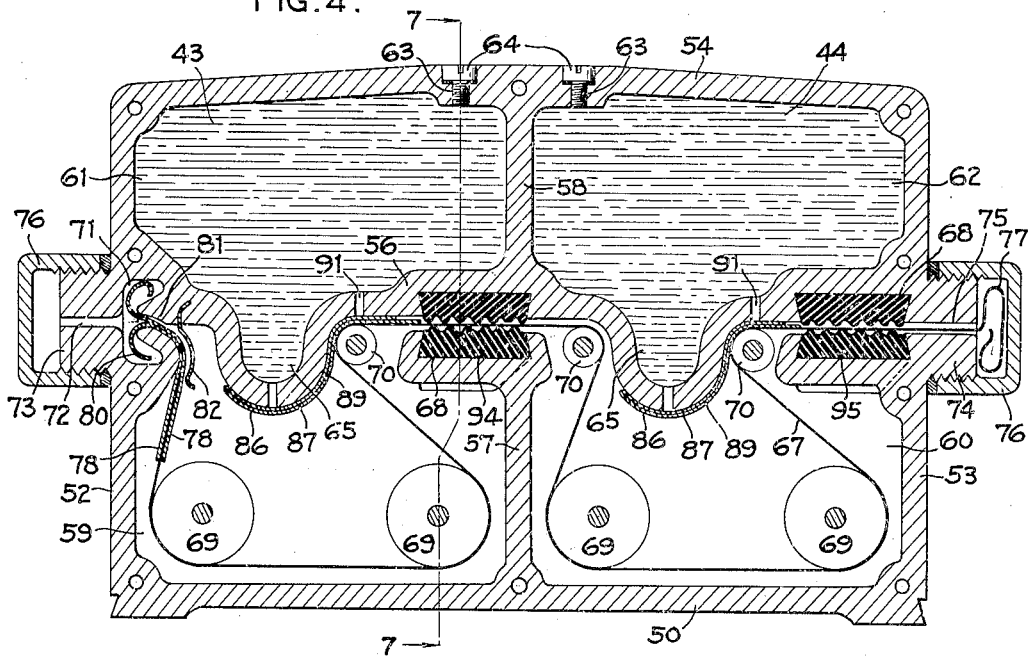
Fig. 4 is a vertical sectional view through the processing unit constructed in accordance with the present invention, showing the relation of the parts when received by the user.

Figs. 1 and 2 show the complete machine for processing, drying and winding up a strip of motion picture film F. The various mechanisms are positioned in a housing formed with a base 11, side walls 12 and 13, a back wall 14 of the shape best shown in Fig. 2 and a top 15. The front is closed by a panel 16 secured to the housing in any suitable well-known manner. The inside of the housing is divided by a pair of spaced L-shaped walls 17, the purpose of which will be later described. The unexposed film strip F which is to be developed or processed is positioned in a suitable housing, magazine or container 18 carried by the housing 11, as is best shown in Fig. 1. From the magazine 18, the film is passed through a suitable light-tight member to the processing unit, broadly designated by the numeral 19 and to be later more fully described. The light-tight member is preferably of the shape shown in Fig. 1 and comprises a curved stationary portion 20, see Fig. 3, and a complementary curved movable portion 21 pivoted at 22 on the base 11. When the film is to be processed, the leading end 23 is withdrawn from the magazine 18 and the part 21 is swung to the dotted position shown in Fig. 1 so that the film strip may be laid on the stationary portion 20, as shown in Fig. 3. The leading end 23 of the film is then inserted into the processing unit and the portion 21 is then swung to the full-line position shown in Fig. 1 to provide a light-tight seal or chamber between the magazine 18 and the processing unit 19.

The film strip F is drawn through the processing unit 19 by means of a drum 26 carried by one end of a shaft 27, the other end of which has mounted thereon a pulley 28 connected by a belt 29 to a shaft 30 connected to a motor 31 through a reducing gearing 32, the motor being positioned in the drying chamber 33 arranged between the L-shaped members 17, as clearly illustrated in Figs. 1 and 2. The shaft 34 of the motor 30 has mounted thereon a fan 35 positioned in the chamber 33 adjacent the portion of the film strip between the unit 19 and the drum 26 to dry the developed and processed film prior to its passage over the drum 26. From the drum 26, the film passes to a wind-up reel 36 carried by a shaft 37 connected through a slip clutch 38 to a shaft 39 having a pulley 40 connected by a belt 41 to a pulley 42 on shaft 30. Thus both the drum 26 and the take-up reel 36, as well as the fan 35, are driven from the motor 31, the clutch 38 providing the necessary slip required during the wind-up operation, for reasons well known to those in the art. The film strip is thus unwound from the film magazine 18 and is then drawn through the processing unit 19 where it is developed and fixed. The processed film is then dried and finally wound up on the reel 36.

As mentioned above, the processing unit 19 is a self-contained member which can be inserted in position as shown in Fig. 1, and after a roll of film has been developed and fixed, the unit is removed and replaced by a new unit.

Referring now to Figs. 4 to 9 there is shown a processing unit 19 constructed in accordance with one embodiment of the invention. The unit is in the form of a hollow light-tight box made of plastic or other suitable material formed to provide a bottom 50, back wall 51, end walls 52 and 53, and a top 54. A separate front wall 55 is suitably secured and/or sealed to the front of the box to form a light-tight and liquid-tight unitary structure.

Figure 5:
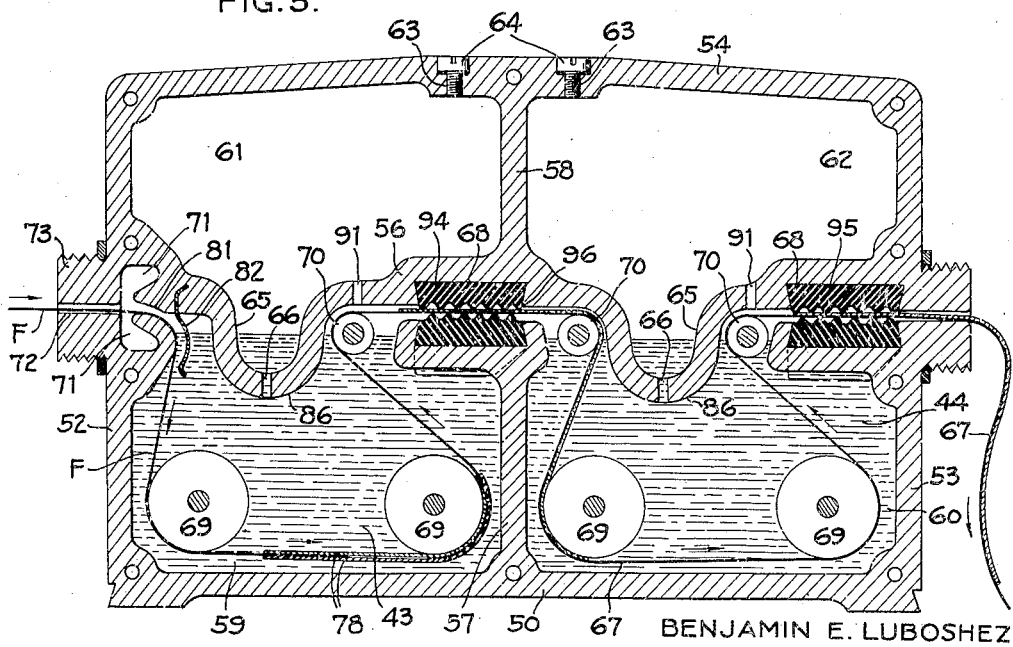
Fig. 5 is a view similar to Fig. 4, but showing the relation of parts when exposed sensitized film is being drawn through the unit.
Figure 6:
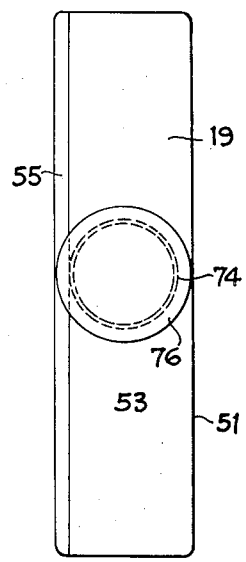
Fig. 6 is a side view of the processing unit illustrated in Figs. 4 and 5.
Figure 7:
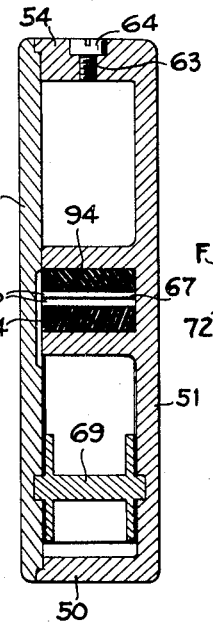
Fig. 7 is a sectional view taken substantially on lines 7—7 of Fig. 4, showing the arrangement of film guides and the wipers or squeegees.

The interior of the unit is divided by a horizontal wall 56 and a pair of vertically aligned walls 57 and 58 into two lower processing compartments 59 and 60 and two upper liquid supply chambers or reservoirs 61 and 62, as best shown in Figs. 4 and 5. The compartment 59 is adapted to receive the developing solution to develop the film, while the compartment 60 is adapted to receive the fixing solution to fix the developed film or to render the developed image permanent. The chambers 61 and 62 on the other hand are adapted to receive a supply of developing and fixing solutions 43 and 44 respectively. The top 54 is provided with a pair of filling holes 63 through which the solution or liquid may be poured into the liquid chambers 61 and 62. Screw closure caps 64 serve to provide a liquid tight seal for the holes 63 and thus retain the liquids in the liquid-tight chambers until ready for use.

The developing and fixing solutions 43 and 44 are thus retained in the sealed chambers 61 and 62 until they are ready for use so that the unit 19 may be easily handled and/or shipped without any danger of spilling or mixing the solutions. When, however, the film strip is to be processed, the developer 43 is allowed to flow from the chamber 61 to the compartment 59, while the fixing solution 44 passes from the chamber 62 to the compartment 60. To secure this result, the bottom portions of the chambers are provided with wells 65 formed by the bent portions of the horizontal wall 56, as shown in Figs. 4 and 5. Each well is provided at its lowest point with a discharge opening 66 which, when open, will provide a liquid communication between the chamber and the compartment positioned below, as will be apparent from an inspection of Figs. 4 and 5. Prior to use, however, these openings 66 are suitably sealed, as will be later described, to retain the solutions in the supply chambers 61 and 62.

Figure 8:
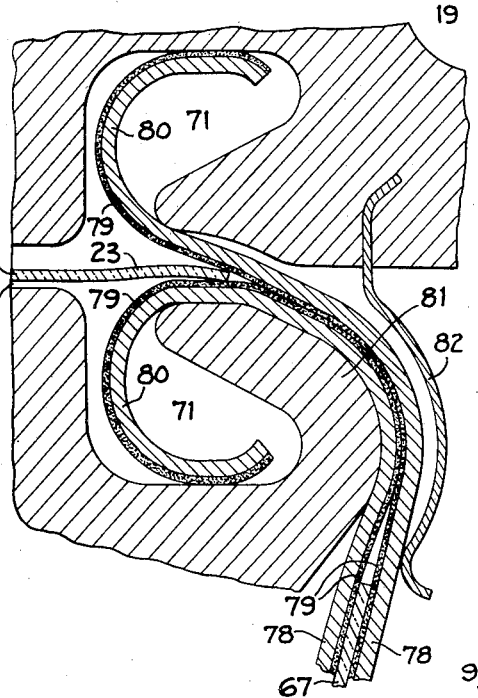
Fig. 8 is a partial sectional view through a portion of the processing unit illustrated in Figs. 4 and 5 but on a larger scale than the latter, showing the preferred arrangement for connecting the film strip to the leader strip positioned in the unit.

The unit 19 has preferably initially threaded therethrough, at the factory, a leader 67 the trailing end of which is connectible to the leading end 23 of the film strip F, as shown in Fig. 8 and to be later described. The leading end of the trailer may be secured to the wind-up mechanism and thus serve to draw the film strip through the processing compartments 59 and 60. At the sides of the compartments, the horizontal wall 56 is enlarged and formed with a horizontal slot or opening 68 through which the leader is threaded and through which the film strip passes to and from the processing compartment. The compartments are provided with suitable guide members in the form of lower rollers 69 and upper rollers 70. These rollers serve to direct the film strip into and out of the processing or treating solutions positioned in the compartments 59 and 60, as is apparent. The left end of the wall 56, as viewed in Figs. 4 and 5, is enlarged to provide a recess 71 which connects the compartment 59 with an inlet or feed slot 72 in a hub 73 formed on the end wall 52. The opposite wall 53 is provided with a similar hub 74 formed with an exit or outlet slot 75 in horizontal alignment with the top of the drum 26. The hubs 73 and 74 are threaded to receive screw caps 76 which effectively close the slots. The leading end 77 of the leader 67 projects through the exit slot 75 and is positioned in the right hand cap 76 so that when the cap is removed, the leading end 77 of the leader 67 may be grasped and connected to the wind-up mechanism.

The trailing end of the leader strip 67 is provided with a catch or securing device which is arranged to automatically connect the leading end 23 to the film strip to the leader so that movement of the latter through the unit 19 serves to draw the film therethrough and through the processing solutions in the compartments 59 and 60. Referring now to Fig. 8, the catch or securing device of the present invention comprises, in the preferred embodiment, a pair of adhesive strips 78 secured to the opposite faces of the trailing end of the leader 67, the adhesively coated surfaces 79 of the strip facing each other and being secured to opposite sides of the leader 67. The ends 80 of the adhesive strips 78 are bent outwardly and are arranged in curled relation, as shown in Fig. 8 to permit the reception of the leader end 23 and the film strip therebetween. Thus as the film strip F is inserted through the entrance or inlet slot 72, the leading end 23 of the film strip is inserted between the spaced ends 80 of the strips 78. In order to retain the ends 80 in spaced relation, the adhesive coated surfaces 79 thereof are adhered to the opposite walls of the recess 71, as illustrated in Fig. 8.

Now as leading end 77 of the leader 67 is pulled, the latter is drawn to the right through the unit 19. This movement of the leader first serves to disengage the coated strip from the opposite walls of the recess 71. Further movement of the leader 67 will then cause the coated surfaces 79 of the ends 80 of the strips 78 to move into and adhesively engage the opposite sides of the leading end 23 of the film strip to securely connect the film to the leader. The film strip is thus sandwiched between and is adhesively connected to the ends 80 of the strips 78. These laminated members then pass over a curved surface 81 to cooperate with the spring 82 to firmly press the adhesive strips into firm engagement with the film strip. By means of this simple arrangement, the film strip is securely attached to the leader, and all the operator has to do is to insert the leading end 23 of the film strip through the inlet slot 72 and then pull on the leading end 77 of the trailer 67, and now connect the latter to the wind-up mechanism. The movement of the leader thus serves to draw the leader and the film through the processing or treating compartments 59 and 60, as shown in Fig. 5.

Figure 9:
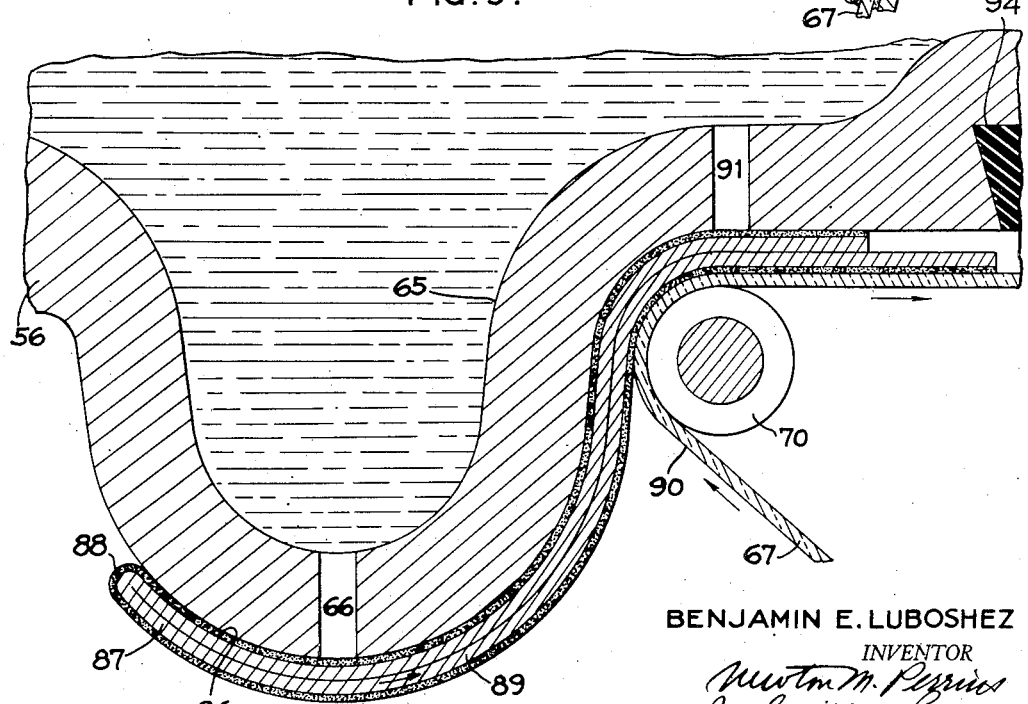
Fig. 9 is a partial sectional view of the lower portion of one of the liquid chambers, shown in Figs. 4 and 5, but on a larger scale than the latter, showing one method of sealing the chambers and in removing the seal when the unit is to be used.

However, before the film reaches the compartments it is necessary to unseal the openings or holes 66 to let the solutions or liquids in the supply chambers 61 and 62 flow downwardly into the proper processing compartments 59 and 60. In the arrangement shown in Figs. 4 and 5, this unsealing is secured by movement of the leader 67. To secure this result, the under surface 86 of each well portion 65 has secured thereto a strip of adhesive material 87, the coating 88 of which engages the surface 86, as best shown in Fig. 9. This strip is folded back on itself so as to provide a portion 89 the adhesive coating 88 of which is secured to the surface 90 of the leader 67, as best shown in Fig. 9. It will now be apparent that when the leader 67 is pulled to the right it will pull along the adhesive strip 87 to strip the latter from the surface 86 to unseal the openings 66. As the material 87 is stripped off, the coated surface 88 thereof engages and sticks to the surface 90 of the leader so that no adhesive or sticking surface of the sealing strip is exposed during its passing through the unit, thus effectively eliminating any possibility of clogging the various passages, the disadvantages of which are apparent.

To facilitate the ready draining of the liquids from the chambers 61 and 62 into the compartments 59 and 60, the wall 56 from each compartment is provided with a vent opening 91 positioned above the drain 66 to allow the air in the compartments to vent into the chambers. These vent holes are also covered by the adhesive material 87 and are opened when the material is stripped off by the leader, as above described.

Thus the drains 66 and vents 91 are normally sealed, and when the film is to be processed, the leader is moved to the right through the unit thus automatically stripping off the material 87 and opening the drains and vents and also serving to draw the film strip into and through the processing chambers and through the liquids or solutions contained therein. By means of this arrangement, the liquids are retained in the sealed chambers 61 and 62 until ready for use, and at such time are readily rendered effective to process the film.

The sealing arrangement illustrated in Figs. 4 and 5, and above described, is primarily intended for use in processing at room temperature in which case the various treating solutions or liquids are not heated. In some cases, however, it is desirable, or preferred, to heat the various treating solutions during the processing operation. In such a case, the drains 66 and the vents 91 may be sealed by suitable low melting point metal or alloy 92, the particular material used depending, of course, on the temperature to which the solutions are heated. As such metals and alloys are well known, a detailed discussion thereof is not deemed necessary. In such use, the unit 19 may be placed in a suitable heating bath, or other well-known means may be utilized for applying heat to the solutions in the chambers 61 and 62. When the solutions reach the desired temperature, the metal 92 fuses and opens the drains 66 and vents 91. The metal is preferably dropped from the drains and vents and is caught in a small cup-like member 93 positioned below the drains and vents, as illustrated in Fig. 15.

As the developed film leaves the developing compartment 59 it passes through a squeegee 94 which removes excess developer from the film strip prior to its passing to the fixing compartment 60. After fixing, the film strip passes through another squeegee 95 prior to its removal thereof from the unit 19. Each squeegee is formed from two pieces of rubber or similar material set in dovetailed slots formed in the dividing wall 56. The adjacent surfaces of the squeegee members are provided with yieldable or resilient fingers 96 through which the film passes and which effectively wipes the surplus liquid from the film, as is well known in the art. Thus the passing of the film strip through the unit 19 serves not only to develop and fix the film but also to wipe and clean the film surfaces.

Figs. 11 and 12 show a modified arrangement in which the unit 19 is split along the horizontal line through the wall 56 to provide a lower portion 100 containing the processing compartments 59 and 60 and an upper portion 101 containing the liquid chambers 61 and 62. Parts corresponding to those shown in Figs. 4 and 5 will be designated by the same numerals. In this embodiment, the bottoms of the liquid chambers are formed with deep U-shaped wells 102, the lower surfaces 103 of which act as film guides and cooperate with curved surfaces 104 formed on the portion 100 to direct the film strips to the processing compartments 59 and 60. Each squeegee has a part thereof carried by the upper portion 101 and a cooperating part carried by the lower portion 100. When, however, the portions are arranged in operating relation, the squeegees are arranged as shown in Fig. 11 and act in the same manner as squeegees shown in Figs. 4 and 5 as above described.

In use, the unit is placed in position in the machine illustrated in Fig. 1 and the upper portion 101 is removed. A short length of film strip to be processed is then drawn out of the light trap between the magazine 18 and unit 19 and is drawn across the upper top of the lower portion 100, as shown in Fig. 12, and connected to the wind-up mechanism in any suitable and well-known manner. Thus a short length of film is led across the lower portion 100. The top portion 101 is now moved into position to overlie the lower portion 100. This movement causes the well portions 102 to engage portions of the film strip to move the latter downwardly into the compartments 59 and 60, as shown in Fig. 11.

The film strip is now in position in the processing compartment and ready to be acted upon by the liquids which are still sealed in the liquid chambers 61 and 62. Each drain 66 is coated or sealed by a rupturable member 105 secured to the surface 103. Any suitable means may be utilized to rupture this member to permit the processing liquids to drain through the openings 66 and into the compartments. In the arrangement shown, such rupturing means comprise a needle-like member 106 extending into the well 102 and formed on the lower end of a push rod 107 the upper end of which extends through an opening 108 in the top 54 and carries a finger piece 109 positioned in the recess 110. A spring 111 tends to move the member 109 to retain the needle 106 in its upward position, as shown at the left in Fig. 11. A sealing strip 112 closes the recess 110 to provide a positive liquid seal therefor. When the parts are in the position shown at the left in Fig. 11 and it is desired to drain the liquid into the compartment, the operator presses down on the seal 112 to break the latter, as shown at the right in Fig. 11, thus providing an air vent to the liquid chamber. The finger pieces 109 are then pushed downwardly and similarly move the rods 107 and the needle members 106 to bring the latter into puncturing or rupturing relation with the strips 105 to open the drain 66 to allow the liquids to flow from the upward liquid chambers into the lower processing compartments. The openings 66 and the needles 106 are preferably offset laterally from the film, as shown in Fig. 14, so that the latter will not be pierced when the member 105 is punctured. After the members 105 are pierced, the finger pieces 109 are released, and springs 111 return the mechanisms to the upper position as shown at the left in Fig. 11. The push rods 107 are preferably guided in guide slots 113 formed in the walls of the wells 102, as shown in Fig. 14. It is obvious, of course, that the sealing and rupturing arrangement shown in Figs. 11 and 12 are also adapted for use in the box constructions shown in Figs. 4 and 5.

It is thus apparent from the above description that the present invention provides a simple, effective and easily operating processing machine for motion picture film. Also the entire mechanism is portable and may be readily moved from place to place and enables processing to be done in daylight thus eliminating the necessity of a darkroom. While the apparatus has been described in connection with developing and fixing of a roll of photographic film, it is apparent that such an apparatus is designed for uses whenever a treating solution is to be applied to a strip of material. Also, the processing unit is compact, easy removable, and eliminates the necessity of mixing and handling the processing liquids or solutions. After one roll of film is processed it is necessary only to remove the unit and replace it with a new unit in which the solutions of proper strength are retained in sealed chambers until the time of use. While only two processing compartments have been illustrated, it is apparent that the unit 19 may be provided with any desired number of processing compartments and liquid supply chambers. Also the units may be arranged in series to provide a multi-compartment apparatus. While the liquid chambers have been shown as positioned above the compartment, it is apparent that the chambers and compartments may be arranged in side-by-side relation.

While certain embodiments of the invention have been disclosed, it is to be understood that the inventive idea may be carried out in a number of ways. The present application is, therefore, not to be limited except insofar as necessitated by the scope of the appended claims.

I claim:

1. A compact processing unit through which a strip is adapted to be drawn to subject the strip to a processing liquid comprising, in combination, a hollow casing formed with a strip inlet and a strip outlet, a horizontal wall in said casing dividing the interior thereof into a lower liquid processing compartment and an upper liquid supply chamber, said wall having an opening therein to permit liquid communication between said chamber and compartment, a leader threaded through said compartment for drawing said strip therethrough, means on the trailing end of said leader for connecting said strip thereto, a non-replaceable seal for closing said opening, and means controlled by said leader for removing said seal when said strip is to be drawn through said compartment to permit the liquid to flow from said chamber to said compartment to process said strip as it is drawn therethrough.

2. A compact processing unit through which a strip is adapted to be drawn to subject the strip to a processing liquid comprising, in combination, a hollow casing formed with a strip inlet and a strip outlet, a horizontal wall in said casing dividing the interior thereof into a lower liquid processing compartment and an upper liquid supply chamber, strip guide means positioned in said compartment, said wall having an opening therein adapted to permit liquid communication between said chamber and said compartment, said wall being formed with horizontal passages connecting said compartment to said inlet and said outlet, a leader extending through said passage and arranged over said guide means, means on said leader in said passage adjacent said inlet for connecting said strip to said leader, a non-replaceable seal for closing said opening, and means for destroying said seal permanently when said strip is to be drawn through said unit to permit the liquid to flow from said chamber to said compartment to process said strip as it passes therethrough.

3. A compact processing unit through which a strip is adapted to be drawn to subject the strip to a processing liquid comprising, in combination, a hollow casing formed with a strip inlet and a strip outlet, a horizontal wall in said casing dividing the interior thereof into a lower liquid processing compartment and an upper liquid supply chamber, strip guide means positioned in said compartment, said wall having an opening therein adapted to permit liquid communication between said chamber and said compartment, said wall being formed with horizontal passages connecting said compartment to said inlet and said outlet, a leader extending through said passage and arranged over said guide means, means on said leader in said passage adjacent said inlet for connecting said strip to said leader, a strip wiper positioned in said passage adjacent said outlet to wipe said film as it leaves said compartment, a breakable seal for closing said opening, and means for breaking said seal to permit the liquid to flow from said chamber to said compartment to process said strip as it passes therethrough.

4. A compact portable processing unit through which a strip is adapted to be drawn to subject the strip successively to a plurality of processing liquids comprising, in combination, a hollow casing having intersecting horizontal and vertical walls which divide the interior of said casing into a plurality of lower processing compartments and a plurality of upper liquid supply chambers, one chamber and compartment comprising a section, a passage formed in said horizontal wall, film guides positioned in said compartments, said horizontal wall having an opening between each chamber and compartment, non-replaceable removable means for sealing said openings, means to remove said seal permanently to place said chambers in liquid communication with said compartments to allow the liquid to enter the latter to process the strip as it passes therethrough, and film wipers positioned in said passage at the outlet of each compartment to wipe said strip as it leaves each compartment.

5. A compact processing unit through which a strip is adapted to be drawn to subject the strip to a processing liquid comprising, in combination, a hollow casing formed with a strip inlet and a strip outlet, a horizontal wall in said casing dividing the interior thereof into a lower liquid processing compartment and an upper liquid supply chamber, said wall having a vertical opening adapted to connect said chamber and compartment in liquid communication and also a horizontal passage connecting said compartment to said inlet and outlet, strip guide means positioned in said compartment, a leader threaded through said passage and over said guide means, a pair of strip engaging members carried by the trailing end of said leader adjacent said inlet and adapted to receive said strip therebetween when the latter is inserted through said inlet, means for moving said engaging members into holding relation with said strip to connect the latter to said leader for movement as a unit therewith through said compartment, a destroyable seal for said opening to cut off said communication, and means to destroy said seal to permit the flow of said liquid from said chamber to said compartment so that said strip may be processed during the passage thereof therethrough.

6. A compact processing unit through which a strip is adapted to be drawn to subject the strip to a processing liquid comprising, in combination, a hollow casing formed with a strip inlet and a strip outlet, a horizontal wall in said casing dividing the interior thereof into a lower liquid processing compartment and an upper liquid supply chamber, said wall having a vertical opening adapted to connect said chamber and compartment in liquid communication and also a horizontal passage connecting said compartment to said inlet and outlet, strip guide means positioned in said compartment, a leader threaded through said passage and over said guide means, a pair of strip engaging members carried by the trailing end of said leader adjacent said inlet and adapted to receive said strip therebetween when the latter is inserted through said inlet, means for moving said engaging members into holding relation with said strip to connect the latter to said leader for movement as a unit therewith through said compartment, a removable seal for closing said opening, means to remove said seal to permit the flow of said liquid from said chamber to said compartment so that said strip may be processed during the passage thereof therethrough, and a squeegee positioned in said passage adjacent the outlet of said compartment to wipe said strip upon emerging from said compartment.

7. A compact processing unit through which a strip is adapted to be drawn to subject the strip to a processing liquid comprising, in combination, a hollow casing formed with a strip inlet and a strip outlet, a horizontal wall in said casing dividing the interior thereof into a lower liquid processing compartment and an upper liquid supply chamber, said wall having an opening therein to permit liquid communication between said chamber and compartment, a leader threaded through said unit and extending into said compartment, means on said leader for connecting said strip thereto for drawing said strip through said compartment, means for sealing said opening to prevent the flow of liquid from said chamber to said compartment, and means controlled by the movement of said leader through said compartment for removing said seal from said opening to permit the passage of said liquid from said chamber to said compartment to process said strip when the latter passes through said compartment.

8. A compact processing unit through which a strip is adapted to be drawn to subject the strip to a processing liquid comprising, in combination, a hollow casing formed with a strip inlet and a strip outlet, a horizontal wall in said casing dividing the interior thereof into a lower liquid processing compartment and an upper liquid supply chamber, said wall having an opening therein to permit liquid communication between said chamber and compartment, a leader threaded through said unit and extending into said compartment, means on said leader for connecting said strip thereto for passage through said compartment, a sealing strip connected to said wall and extending over said opening to close the latter to retain said liquid in said chamber, and a portion of said sealing strip connected to said leader and movable as a unit therewith when said leader is moved through said unit to disengage said sealing strip from said wall to uncover said opening to allow said liquid to flow from said chamber to said compartment to engage said strip to process the latter during the passage thereof through said compartment.

9. A compact processing unit through which a strip is adapted to be drawn to subject the strip to a processing liquid comprising, in combination, a hollow casing formed with a strip inlet and a strip outlet, a horizontal wall in said casing dividing the interior thereof into a lower liquid processing compartment and an upper liquid supply chamber, said wall having an opening therein to permit liquid communication between said chamber and compartment, a leader threaded through said unit and extending into said compartment, means on said leader for connecting said strip thereto for passage through said compartment, a piece of adhesively coated tape having one portion secured to said wall and covering said opening to seal the latter, and another portion adhesively connected to said leader whereby the movement of said leader through said compartment will strip said piece from said wall to uncover said opening to allow the liquid to flow therethrough from said chamber to said compartment to process said strip as it passes through said compartment.

10. A compact processing unit through which a strip is adapted to be drawn to subject the strip to a processing liquid comprising, in combination, a hollow casing formed with a strip inlet and a strip outlet, a horizontal wall in said casing dividing the interior thereof into a lower liquid processing compartment and an upper liquid supply chamber, said wall having an opening therein to permit liquid communication between said chamber and compartment, said wall having a passage formed therein, a leader threaded through said passage and said compartment, means on said leader for engaging said strip to draw the latter through said compartment upon movement of said leader therethrough, means for sealing said opening to prevent the flow of liquid from said chamber to said compartment, means controlled by the movement of said leader for moving said sealing means to uncover said opening to permit said liquid to flow from said chamber to said compartment to process said strip as it is drawn therethrough by said leader, and means adjacent the outlet of said compartment for wiping said film.

11. A compact processing unit through which a strip is adapted to be drawn to subject the strip to a processing liquid comprising, in combination, a hollow casing formed with a strip inlet and a strip outlet, a horizontal wall in said casing dividing the interior thereof into a lower liquid processing compartment and an upper liquid supply chamber, said wall having an opening therein to permit liquid communication between said chamber and compartment, and a heat fusible metal positioned in said opening to seal the latter, the fusion of said metal serving to open said opening to permit said liquid to pass from said chamber to said compartment to process said strip during the passage thereof through said compartment.

12. A compact processing unit through which a strip is adapted to be drawn to subject the strip to a processing liquid comprising, in combination, a hollow casing formed with a strip inlet and a strip outlet, a horizontal wall in said casing dividing the interior thereof into a lower liquid processing compartment and an upper liquid supply chamber, said wall having an opening therein to permit liquid communication between said chamber and compartment, a rupturable member covering said opening, and means for rupturing said member to permit the flow of liquid from said chamber to said compartment to process said strip during the passage thereof through said compartment.

13. A compact processing unit through which a strip is adapted to be drawn to subject the strip to a processing liquid comprising, in combination, a hollow casing formed with a strip inlet and a strip outlet, a horizontal wall in said casing dividing the interior thereof into a lower liquid processing compartment and an upper liquid supply chamber, said wall having an opening therein to permit liquid communication between said chamber and compartment, a rupturable member covering said opening, and manual controlled means for rupturing said member to open said opening to permit said liquid to flow into said compartment to process said strip.

14. A compact two-piece processing unit through which a strip is adapted to be moved to subject the strip to a processing liquid comprising, in combination, a hollow lower member forming a liquid processing compartment, a hollow upper member forming an upper liquid supply chamber and cooperating with the lower member to provide a complete self contained unit, a top wall on said lower member formed with an aperture, a lower wall on said upper member for closing said compartment, said lower wall being formed with an opening in registry with the aperture and adapted to place said chamber in liquid communication with compartment, means for sealing said opening to retain said liquid in said chamber, said members being separable to permit said strip to be placed across said top wall, means on said upper member for moving said strip into said compartment when said upper member is arranged to overlie said lower member, said top and lower walls being formed with registering recesses to provide slots through which said strip may be fed into and out of said compartment, and means for removing said seal to open said opening to permit the liquid to flow from said chamber to said compartment to process said strip as it passes therethrough.

15. A compact two-piece processing unit through which a strip is adapted to be moved to subject the strip to a processing liquid comprising, in combination, a hollow lower member forming a liquid processing compartment, a hollow upper member forming an upper liquid supply chamber and cooperating with the lower member to provide a complete self contained unit, a top wall on said lower member formed with an aperture, a lower wall on said upper member for closing said compartment, said lower wall having a depending portion adapted to extend through said aperture and into said compartment, said portion serving to move said strip into said compartment when said upper member is placed on said lower member, said portion also providing a guide for said strip in said compartment and formed with an opening adapted to place said chamber in liquid communication with said compartment, a strip of rupturable material covering said opening to seal the latter, and means for rupturing said material to allow the liquid to flow from said chamber to said compartment to process said strip.

16. A compact two-piece processing unit through which a strip is adapted to be moved to subject the strip to a processing liquid comprising, in combination, a hollow lower member forming a liquid processing compartment, a hollow upper member forming an upper liquid supply chamber and cooperating with the lower member to provide a complete self contained unit, a top wall on said lower member formed with an aperture, a lower wall on said upper member for closing said compartment, said lower wall being formed with an opening in registry with the aperture and adapted to place said chamber in liquid communication with compartment, means for sealing said opening to retain said liquid in said chamber, said members being separable to permit said strip to be placed across said top wall, means on said upper member for moving said strip into said compartment when said upper member is arranged to overlie said lower member, said top and lower walls being formed with registering recess to provide slots through which said strip may be fed into and out of said compartment, means for removing said seal to open said opening to permit the liquid to flow from said chamber to said compartment to process said strip as it passes therethrough, and squeegee means positioned in the slot at the outlet of said compartment for wiping said strips as it leaves the compartment.

17. A strip processing apparatus comprising, in combination, a support, a non-refillable and expendable liquid applying unit removably positioned on said support, normally empty liquid treating compartments formed in said unit and adapted to receive processing liquid through which said strip may be moved to process the latter, liquid supplying chambers filled with processing liquids, drains formed in said chambers for connecting the latter in liquid communication with said compartments to allow the liquids to flow from said chambers to said compartments, non-replaceable seals for closing said drains to retain said liquids in said chambers until said strip is to be processed, means for removing said seal permanently to place said chambers in liquid communication with said compartments so that said liquid may flow into the latter; and means for drawing the strip through said compartments.

18. A strip processing apparatus comprising in combination, a support, a non-refillable and expendable liquid applying unit removably positioned on said support, normally empty liquid treating compartments formed in said unit and adapted to receive processing liquid through which said strip may be moved to process the latter, liquid supplying chambers, drains formed in said chambers for connecting the latter in liquid communication with said compartments to allow the liquids to flow from said chambers to said compartments, destroyable seals for closing said drains to retain said liquids in said chambers until said strip is to be processed, means for destroying said seals to place said chambers in liquid communication with said compartments so that said liquid may flow into the latter, means for drawing the strip through said compartments, and strip wiping means positioned in said unit for wiping said strip as it leaves each compartment.

BENJAMIN E. LUBOSHEZ

REFERENCES CITED

The following references are of record in the file of this patent:

UNITED STATES PATENTS

| Number | Name | Date |
|---|---|---|
| 1,319,026 | DeYbarrondo | Oct. 14, 1919 |
| 1,808,669 | Liberman | June 2, 1931 |
| 1,846,075 | Aller et al. | Feb. 23, 1932 |
| 1,900,825 | Liberman | Mar. 7, 1933 |
| 2,137,256 | Waldron | Nov. 22, 1938 |
| 2,158,001 | Dazey | May 9, 1939 |
| 2,385,681 | Brick | Sept. 25, 1945 |
| 2,395,970 | Kershaw | Mar. 5, 1946 |

FOREIGN PATENTS

| Number | Country | Date |
|---|---|---|
| 322,877 | Italy | Nov. 28, 1934 |
| 446,251 | Great Britain | July 20, 1934 |